3,178,460
PROCESS FOR THE MANUFACTURE OF STEROIDS HAVING AN AROMATIC RING A
Oskar Jeger and Kurt Schaffner, Zurich, Switzerland, assignors to Ciba Corporation, New York, N.Y., a corporation of Delaware
No Drawing. Filed May 7, 1963, Ser. No. 278,776
Claims priority, application Switzerland, May 11, 1962, 5,737/62; Mar. 12, 1963, 3,154/63
11 Claims. (Cl. 260—397.4)

The present invention provides a new process for the manufacture of $\Delta^{1,3,5(10)}$-19-norsteroidtrienes starting from $\Delta^4$-3-oxo-10-acyloxy-19-norsteroids.

The steroids having an aromatic ring A, more especially those of the oestrane series, are compounds of considerable therapeutic action. The foremost representatives of this type of compound are the oestrogens occurring in nature: oestrone, oestradiol and oestriol, as well as oestradiols substituted in position 17 by a saturated or unsaturated hydrocarbon radical, which are accessible by synthesis and have recently become particularly important, and their 3-alkyl (such as 3-methyl) ethers, for example $\Delta^{1,3,5(10)}$-3-methoxy-17-hydroxy-17-methyl-, -17-ethyl-, or -17-ethinyloestratriene, said compounds being used for remedying cyclic disturbances or as oestrogenic components for contraceptives.

The aforementioned steroids having an aromatic ring A were in the past accessible, apart from the extractive process, only by total synthesis or by the circuitous route via $\Delta^{1,4}$-3-oxosteroiddienes and their pyrolysis at high temperatures.

Since it is nowadays very easy to manufacture 19-hydroxysteroids from 19-unsubstituted steroids (see U.S. patent application Serial No. 222,168, filed September 7, 1962, by Albert Wettstein et al., U.S. Patent No. 3,067,198, patented December 4, 1962, to Albert Wettstein et al., and U.S. Patent No. 3,077,482, patented February 12, 1963, to Albert Wettstein et al.), these compounds may be used with advantage in the manufacture of the aforementioned substances. Our copending application Serial No. 278,777, filed May 7, 1963, describes the conversion of 19-hydroxy-steroids into $\Delta^4$-3-oxo-10-acyloxy-19-nor compounds and their 6-dehydro derivatives. The present invention is based on the observation that excellent yields of $\Delta^{1,3,5(10)}$-3-hydroxy-19-norsteroidtrienes are obtained by heating $\Delta^4$-3-oxo-10-acyloxy-19-norsteroids.

In the reaction of the present process the elimination of one molecular proportion of carboxylic acid is accompanied by the formation of the 1:10-double bond which automatically causes enolisation of the 3-oxo group and, consequently, the aromatization of the ring according to the following scheme of partial formulae:

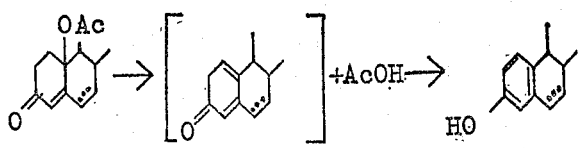

From J. Am. Chem. Soc. 82, page 2402 (1960), it is known that 10-halogeno-$\Delta^4$-3-oxo-19-norsteroids are readily converted into $\Delta^{4,9(10)}$-3-oxo-19-norsteroids with elimination of hydrohalic acid. This reaction does not cause aromatization of the ring A. Thus, elimination of the acyloxy group in 10-acyloxy-$\Delta^4$-3-oxo-19-norsteroids accompanied by aromatization of the ring A constitutes an unexpected reaction.

The elimination of the 10-acyloxy group according to the invention is achieved by heating the reactants to temperatures above 80° C., for example to 80–200° C., preferably in vacuo, or by short heating in a suitable high-boiling solvent, more especially in a hydrocarbon, for example an aromatic or alicyclic hydrocarbon such as toluene, xylene, tetralin or decalin; or a high-boiling ether such as dioxane, anisol a diethyleneglycol dialkyl ether or the like, or in other high-boiling aromatic compounds, for example nitrobenzene, chlorobenzene or the like.

As starting materials for use in the present process there are suitable $\Delta^4$-3-oxo-10-acyloxy-19-norsteroids, preferably those belonging to the androstane, pregnane, cholane, cholestane, spirastane or cardanolide series, which may contain in one or more than one of the positions 6–9, 12, 14–17, 20, 21 or in the residual side chain further substituents, for example alkyl (such as methyl) groups, halogen atoms, free or functionally converted hydroxyl or oxo groups, such as esterified or etherified hydroxyl groups, or ketalized or enolized oxo groups. Furthermore, the starting materials may contain as substituents in positions 1, 2 and 11 alkyl groups, halogen atoms or functionally converted hydroxyl groups, and more especially in position 6:7, in ring D or in the side chain an additional double bond.

Especially valuable starting materials for the present process are $\Delta^4$-3-oxo-10-acyloxy-19-norsteroids of the androstane and pregnane series, for example:

$\Delta^4$-3-oxo-10-acyloxy-19-norandrostenes,
$\Delta^4$-3:17-dioxo-10-acyloxy-19-norandrostenes,
$\Delta^4$-3-oxo-10-acyloxy-17-hydroxy-19-norandrostenes and their esters,
$\Delta^4$-3-oxo-10-acyloxy-17$\beta$-hydroxy-17$\alpha$-alkyl-, -17$\alpha$-alkenyl- or -17$\alpha$-alkinyl-19-norandrostenes and their esters, for example
$\Delta^4$-3-oxo-10-acyloxy-17$\beta$-hydroxy-17$\alpha$-methyl-, -17$\alpha$-ethyl-, -17$\alpha$-vinyl-, -17$\alpha$-allyl- and -17$\alpha$-ethinyl-19-norandrostenes and their esters; furthermore
$\Delta^4$-3-oxo-10-acyloxy-19-norpregnenes,
$\Delta^4$-3:20-dioxo-10-acyloxy-19-norpregnenes,
$\Delta^4$-3:20-dioxo-10-acyloxy-17$\alpha$-hydroxy-19-norpregnenes and their esters,
$\Delta^4$-3:20-dioxo-10-acyloxy-21-hydroxy-19-norpregnenes and their esters, and the 6-dehydro derivatives thereof.

A specific starting material is $\Delta^4$-3:17-dioxo-10-acetoxy-19-norandrostene which yields oestrone directly in a single operation and the $\Delta^{4,6}$-3:17-dioxo-10-acetoxy-19-norandrostadiene which yields 6-dehydro oestrone.

The above-mentioned starting materials are advantageously made from the corresponding $\Delta^4$- and $\Delta^{4,6}$-3-oxo-19-hydroxysteroids by the process disclosed in copending application Serial No. 278,777, for example:

A $\Delta^4$-3-oxo-19-hydroxysteroid is heated in an apolar solvent, such as benzene, with an oxidizing heavy-metal acylate, for example with lead tetraacetate, and after removing any unreacted starting material the resulting $\Delta^4$-3-oxo-10-acyloxy-19-norsteroid is isolated. It is of advantage to use as starting material for the present process the crude product resulting from the reaction referred to above, as it is, without purification, and in each case a total yield of 70 to 80% referred to the 19-hydroxysteroid used as starting material is obtained.

In the acyloxy compounds mentioned above as suitable starting materials the acid radicals of the ester groupings are preferably those of aliphatic, cycloaliphatic, araliphatic, aromatic or heterocyclic carboxylic acids containing 1 to 15 carbon atoms, being, for example, formates, acetates, propionates, cyclopentylpropionates, valerates, benzoates, furoates, hexahydrobenzoates, phenylpropionates, trifluoroacetates or the like.

The following examples illustrates the invention:

Example 1

120 mg. of $\Delta^4$-3:17-dioxo-10-acetoxy-19-norandrostene are refluxed for 1 hour in 9 cc. of tetralin. The solution is then evaporated under vacuum and the residue is chromatographed on neutral alumina (activity III). Elution with methylene chloride produces 91 mg. of crystalline oestrone melting at 250–252° C. after one recrystallization from acetone+petroleum ether. Identification is performed by way of the mixed melting point, infra-red spectrum and thin-layer chromatogram (solvent system: benzene+methanol 9:1).

Example 2

250 mg. of $\Delta^4$-3:20-dioxo-10-acetoxy-19-norpregnene are heated under a high vacuum of 0.1 mm. Hg for 12 hours at 120–140° C. The reaction product is taken up in benzene and chromatographed on 20 times its own weight of neutral alumina (activity III). Elution with methylene chloride produces 175 mg. of pure $\Delta^{1,3,5(10)}$-3-hydroxy-20-oxo-19-norpregnatriene which, after recrystallization from ethyl acetate, melts at 246–248° C. Optical rotation $[\alpha]_D^{25} = +150°$ (c.=1.10).

Example 3

The solution containing 850 mg. of $\Delta^{4,6}$-3:17-dioxo-10β-acetoxy-19-norandrostadiene (melting at 165° C.) in 10 cc. of decalin is boiled under reflux in a nitrogen atmosphere for one hour. Crystallization of the reaction product occurs after 20 minutes; it is completed by cooling the mixture finally at 0° C. After filtration the crystals are washed with petroleum ether and dried in a water jet vacuum. There are obtained 645 mg. of crude 6-dehydro oestrone melting at 258–260° C. If desired, the faintly pink coloured product can be purified by recrystallization from methylene chloride-methanol containing charcoal.

What is claimed is:

1. Process for the manufacture of $\Delta^{1,3,5(10)}$-3-hydroxy-19-norsteroids, wherein esters of $\Delta^4$-3-oxo-10-hydroxy-19-norsteroids selected from the group consisting of those of the androstane, pregnane, cholane, cholestane, spirostane and cardanolide series with carboxylic acids having up to 15 carbon atoms are heated until evolution of the corresponding carboxylic acid ceases.
2. Process according to claim 1, wherein the reaction is performed between 80 and 200° C.
3. Process according to claim 1, wherein heating is performed in a vacuum.
4. Process according to claim 1, wherein heating is performed in a solvent.
5. Process according to claim 4, wherein a member selected from the group consisting of tetralin and decalin is used.
6. Process according to claim 1, wherein $\Delta^4$-3-oxo-10-acyloxy-19-norandrostenes are used as starting material.
7. Process according to claim 1, wherein $\Delta^4$-3-oxo-10-acyloxy-19-norpregnenes are used as starting material.
8. Process according to claim 1, wherein $\Delta^4$-3:17-dioxo-10-acetoxy-19-norandrostene is used as starting material.
9. Process according to claim 1, wherein $\Delta^{4,6}$-3-oxo-10-acyloxy-19-norandrostadienes are used as starting material.
10. Process according to claim 1, wherein $\Delta^{4,6}$-3-oxo-10-acyloxy-19-norpregnadienes are used as starting material.
11. Process according to claim 1, wherein $\Delta^{4,6}$-3,17-dioxo-10-acetoxy-19-norandrostadiene is used as starting material.

No references cited.

LEWIS GOTTS, *Primary Examiner.*